United States Patent [19]
Günthner

[11] 3,951,636
[45] Apr. 20, 1976

[54] MOLDING APPARATUS

[75] Inventor: Franz Günthner, Mainz, Germany

[73] Assignee: Jenaer Glaswerk Schott & Gen., Mainz, Germany

[22] Filed: May 22, 1974

[21] Appl. No.: 472,266

[52] U.S. Cl. .................................. 65/207; 65/223; 65/305; 65/323; 65/361
[51] Int. Cl.² ...................... C03B 5/30; C03B 9/00
[58] Field of Search ............... 65/361, 68, 305, 223, 65/361, 207

[56] References Cited
UNITED STATES PATENTS

| | | | |
|---|---|---|---|
| 799,332 | 9/1905 | Hartman | 65/361 X |
| 1,904,959 | 4/1933 | Soubier | 65/361 X |
| 2,009,994 | 8/1935 | Cramer | 65/223 |
| 3,622,305 | 11/1971 | Becker | 65/361 X |
| 3,787,196 | 1/1974 | Becker | 65/361 |
| 3,834,884 | 9/1974 | Kurokawa et al. | 65/361 |
| 3,841,859 | 10/1974 | Becker et al. | 65/361 X |
| 3,895,931 | 7/1975 | Hamilton | 65/207 |

Primary Examiner—S. Leon Bashore
Assistant Examiner—Frank W. Miga
Attorney, Agent, or Firm—Burgess, Dinklage & Sprung

[57] ABSTRACT

Apparatus and transport system for production of pressed articles from plastic material, e.g., molten glass. A series of molds is routed on non-linked carriages over an endless course defined by a plurality of cooperating conveyors disposed over the course. The course comprises a charging section, a molding section, a solidification section, and a discharge section. Means can be provided for varying the speed of the carriages by operation of the conveyors in accordance with the working time at the respective sections.

14 Claims, 20 Drawing Figures

MOLDING APPARATUS

BACKGROUND

The invention concerns an apparatus for the manufacture of pressed articles from plastic material, with which the output of articles produced per unit may be varied within wide limits without varying the production time per piece and thus departing from the optimum method of procedure and tool utilization in the individual steps of the operation.

The sequence of operations in the pressing of plastic material, such as glass for example, consists essentially of charging, pressing, solidification and discharging. These steps ought to follow one upon the other insofar as possible, without unnecessary waiting during one of the four operations due to another which takes longer to perform with the result that some of the tools will not be utilized in an optimum manner. However, even where the production procedure is optimized for the individual piece and is to remain unchanged, it ought to be possible to vary the output of the press. These requirements are not fulfilled by machines of the prior art.

In known, intermittently driven round-table presses having one pressing station, the cycle time is determined by the actual pressing as the longest, indivisible operation, resulting in waiting time in the other working stations. Furthermore, to each operation must be added the time required for the table transport, so that in general such presses can achieve only relatively low outputs.

In a continuously circulating press in which each station is equipped with a plunger, a ring and a mold, more tools are installed than would be necessary if tool utilization were optimum.

In presses such as those described, for example, in German Pat. No. 964,093 or in U.S. Pat. No. 2,009,994, in which the plungers and rings are stationary and the molds circulate individually, i.e., without being joined together by a table, the output is just as limited by the at least partially intermittent movement of the molds as it is in the intermittently driven round-table press.

Another aspect of the invention involves the transportation system. Automatic systems have been developed in which the individual workpiece is no longer made at one place by a series of tools engaging it, but instead the workpiece is advanced from one working state to the next by a suitable conveyor member, the individual working steps being able to be set up in a single machine unit or divided among a plurality of machines set up in sequence to form an automatic production system.

In known machines of this kind the conveyor member which functionally interconnects the individual working stages consists of holding means, chucks or the like, in which the workpieces are held for working, and which are joined together by stiff or partially resilient intermediate members to form an endless chain-like structure which circulates in suitable guides within the automatic manufacturing system. It is required that this chain-like structure have a constant division—i.e., that these holding means, chucks or the like be at the same distance from one another.

These known machines may operate in two different ways: either the chain-like conveyor means holding the workpieces advance continuously at constant velocity or they are driven intermittently. In any case, however, the circulation of all workpiece holding means is synchronous.

In the case of intermittent operation the conveyor means and thus also the workpieces are at a standstill during the working procedures which accordingly are performed with stationarily disposed tools. Upon completion of a working procedure the conveyor means moves the workpieces synchronously to the next-following working station and then stops. The division of the conveyor means, i.e., the distance between two successive workpieces, is governed in this method of operation by the spatial dimensions of the largest working station. The spacing at all the rest of the working stations must accordingly be an integral multiple of the required conveyor means spacing; for this reason optimum utilization of floor space is not possible and the automatic system becomes relatively large. The standstill time of the conveyor means during the working is governed by the longest working procedure, so that the tools in the other working stations are not fully utilized time-wise. Another disadvantage of intermittent operation lies in the relatively high acceleration forces which are exerted on the workpieces when the conveyor means is started and stopped. These forces are capable, for example, of deforming freshly blown or cast, still-hot parisons.

The disadvantages caused by the acceleration forces, may be largely avoided by the continuous method of operating the conveyor means. Here the only acceleration forces are radial forces where the direction of the path of movement changes. In the continuous method of operation, in which the conveyor means circulates with uniform velocity, the working tools must be positively propelled together with the conveyor means and hence with the workpiece over certain distances corresponding to the duration of the particular operation. As mentioned, if this is done by means of round tables, for example, on which a plurality of working procedures are performed, each station must necessarily be provided with the tools for all these procedures, which means an extremely poor time-wise utilization of the tools. The spacing of the conveyor means is determined in these known machines by the operation that takes the longest amount of time, and thus it results in further poor time-wise utilization of all those tools whose engagement is required for only a relatively short amount of time. In this respect, continuously operating and intermittently operating machines have similar disadvantages.

In both of the known types of machines the velocity of transport and hence the output of glassware is limited by the fact that in certain working steps the acceleration forces involved in movement lead to difficulties and therefore may not exceed a certain value.

In addition to the indicated disadvantages of the known processes it is therefore impossible, where the end products must fulfill certain quality requirements, to increase the output by increasing the overall speed of the system, because in this case technological limits are reached in different working stations. In this connection, it is possible that it may be technologically very desirable in an otherwise continuous method of operation to bring the workpiece even to a full stop in some of the working stations.

A method of transporting glass material in the piece-by-piece production of glassware ought therefore to be such, in order to avoid the above-described disadvantages, that a great output per unit will be achieved while allowing sufficient time for the individual procedures, and with an acceptable investment in well-utilized tools without allowing the velocity of transportation to increase at any point to technologically undesirable or unacceptable values. The amount of space is to be kept small, and the timing of the transport is to be variable for adaptation to a variety of manufacturing procedures or to a variety of tool combinations to meet the requirements of various products, without thereby greatly reducing the utilization of individual tools. The transport system must also permit the interchange of complete machine units involving a plurality of working stations.

THE INVENTION

The object of the present invention, therefore, is to create a press in which the initially described requirements are fulfilled, which is not the case in the presses that have been known hitherto, and to provide an improved transportation system.

In accordance with the invention, this object is achieved by a press in which the molds or parts of the molds circulate on non-interconnected conveyor elements in a system consisting of round-table assemblies which are joined together by, preferably, straight transport ways or tracks on which the movement of the conveyor elements can be varied and in which each of the round-table assemblies is equipped with a plurality of parallel working stations of the same kind.

This achievement of the object of the invention is based largely on dividing the individual operations among the different members of the system consisting of round-table assemblies and straight transport tracks. Let us select as an example a press consisting of two round-table assemblies and two straight tracks connecting these round-table units. The operations of charging, pressing, solidification and discharging are divided within this basic system such that the charging, i.e., the feeding of the charge of glass to the molds carried by the conveyor elements, takes place on one of the straight tracks before they enter the first round-table assembly. The pressing takes place during passage through the first round-table assembly, the solidification during passage along the second straight track, and removal from the mold and discharge takes place on the way around the second round-table assembly. The conveyor elements together with the mold bottoms then return to the first straight track to be charged.

On their way around the round-table units the conveyor elements are obliged to move at equal distances at a uniform angular velocity, but as they pass through the straight connecting tracks their states of movement may be varied within wide limits. It is therefore possible to vary the actual time of stay in the different sections (round-tables and straight tracks) and thus to adapt it to the particular operation. The first of the requirements set forth in the beginning is thus fulfilled.

The second requirement, namely that the output of the press be able to be varied without altering the optimum production time for the individual piece, is met by the invention in that each of the two round-table assemblies is equipped with a plurality of working stations, but they are of the same kind, and they are connected, so to speak, in parallel. The output of the press can then be varied by the fact that some of the working stations in the round-table assemblies are not provided with tools and a corresponding part of the conveyor elements is not used. Thus the second requirement described in the beginning is fulfilled.

In this manner it is possible without great changes in the press to produce smaller production series with a fraction of the tools that would be necessary for the full equipment of the machine. On the other hand, it is in turn possible to produce several series of small members of pieces simultaneously, that is, to have a mixed production, thereby exploiting the full production capacity of the press.

A set-up in accordance with the example described could be made such that one round-table assembly has four pressing stations and the other round-table assembly has four mold stripping stations, four molds or mold parts being associated with each pressing station. This means that, when the machine is fully equipped, 16 conveyor elements can be circulating (see FIG. 1, discussed infra). At half output, two of the stations in each round-table assembly are not equipped and half of the conveyor elements are likewise not provided with molds or are taken out of circulation. If two different articles are to be produced simultaneously, every other round-table station and every other conveyor element may be provided with the corresponding second tool. The production time per piece, however, remains unchanged.

Further concerning the transport system, that aim is achieved in accordance with the invention by a method of transporting glass material, such as gobs, parisons, pressed pieces, etc. through a series of working stations wherein conveyor elements are joined or not directly joined to one another are carried within a closed transport system, the movements of said elements differing in their condition, at least between two working stations, from the contemporaneous state of the adjacent conveyor elements. That is to say, a non-synchronous movement is involved. The velocity of these conveyor elements may vary constantly in the individual sections of their path of movement, between, if necessary, a temporary full halt and a maximum speed depending on the individual case.

The transport system of the invention makes it possible for parts of the operation of shaping the glassware to be performed, if required, by circulating tools, while other procedures can be performed by tools that remain stationary.

The conveyor elements which circulate within the closed transport system and which are not connected to one another may be of various construction depending on the type of drive used. In a preferred embodiment the conveyor elements are in the form of carriages which are driven in a corresponding track. These carriages may be stopped and restarted as often as desired during the working process. The carriages carry the glass gobs, pressed pieces or parisons which are to be worked, but they may additionally be equipped with tools which take part in the shaping, such as for example the chucks of bottle molds, parts of preliminary molds, etc.

In accordance with the invention, it matters not whether the driving of the carriages is performed by independent, controllable means such that the carriages are transported at a speed which is continuously variable during operation over a certain section of their path, or by means which are dependent upon the apparatus drive, the velocity ratio that is optimum for a range of products being kept constant during the operation of the apparatus in the latter case. The principle of this method is applicable in many ways in glass manufacture.

Thus, the invention provides apparatus for production of pressed object from plastic material by pressing of charges of the material in a series of molds routed on carriages over an endless course comprising a charging section, a pressing section, a solidification section, and a discharging section.

The apparatus comprising a first straight track for receiving empty molds from the discharging section, conveying the empty molds through the charging section for charging of the molds, and then conveying the charged molds to the pressing section. The pressing section is provided by a first round-table assembly, which is disposed to receive the charged molds from the first straight track. The round-table assembly comprises means for pressing the charges to form the charges into the shape of the pressed object.

A second straight track is provided for receiving the charged molds from said first round-table assembly, and conveying the charged molds to the discharging section. Solidification continues during passage of the molds over the second straight track.

The apparatus further includes a second round table assembly, which provides the discharging section. The second round-table assembly is disposed for receiving the discharged molds from the second straight track, and comprises means for discharging the pressed, solidified charges from the molds as said pressed objects, and for delivering the resulting empty molds to the first straight track.

The carriages are mounted on the apparatus for travel over said tracks and said turn table assemblies, and the molds are mounted on the carriages.

Means are provided for driving the carriages and molds over the endless course.

The drive means drives each of the carriages independently. There is no direct link between the carriages, such as in the case of the cars of a railroad train.

For driving the carriages over the straight tracks, the drive means includes cylinders having cam tracks, e.g., grooves winding over the length thereof, and means for rotating the cylinders. The carriages have cams, e.g., projections extending into the grooves, for driving of the carriages in response to rotation of the cylinders.

The drive means can include a conveyor for each straight track, and means for interconnection of the carriages and said conveyors for driving of the carriages over the straight tracks, and means for rotating the turn table assemblies. The drive means can be effective to vary the speed of the carriages over the endless course, whereby the speed of the carriages can be varied in accordance with the working time of the charging, pressing, solidification, and discharging.

The invention further provides a transporting process for the production of molded plastic objects by the molding of the charges of the plastic in a series of molds routed on carriages over an endless course defined by at least two cooperating conveyors disposed over the course. Said course comprises a charging section, wherein the molds are charged with charges of the plastic, a molding section wherein said charges are shaped to the shape of said plastic objects, a solidification section wherein the shaped charges are cooled for solidification thereof, and a discharge section wherein the cooled shaped charges are discharged from the molds. The conveyors include cooperating means for transfer of the carriages between the conveyors, and means for varying the speed of the carriages by the operation of the conveyors in accordance with the working time at the respective sections.

The conveyors can include two parallel side-by-side straight conveyors, a turn around conveyor operatively connecting one pair of adjacent ends of the straight conveyors, and a second turn around conveyor operatively connecting the other pair of adjacent ends of the straight conveyors. As in the drawings, the turn around conveyors can be round-table assemblies.

EMBODIMENTS

A machine in accordance with the invention will be described hereinafter as a concrete embodiment of the example mentioned above, with the aid of the appended drawings.

First, however, let it be noted that the glass charge or gob can be placed in the mold by two different methods depending on the kind of feeder that is used, namely, either:

a. the charge is cut from a continuously emerging strand: the mold can be stopped, the glass strand settles against the floor of the mold, the glass flows into the mold as the mold floor remains still or moves downwardly, and it is cut off. The mold meantime is in the straight track that is located in front of the press round-table assembly. The mold, however, may also be moved ahead at any desired speed during this procedure; or b. the gob is formed into a drop shape in a known gob feeder, is cut off, and drops freely through a guiding system into the mold which may be moving. The gob can land in the mold for example just as the latter reaches the press round-table assembly A fully automatic press in accordance with the invention is represented in the drawings.

Figure 1:
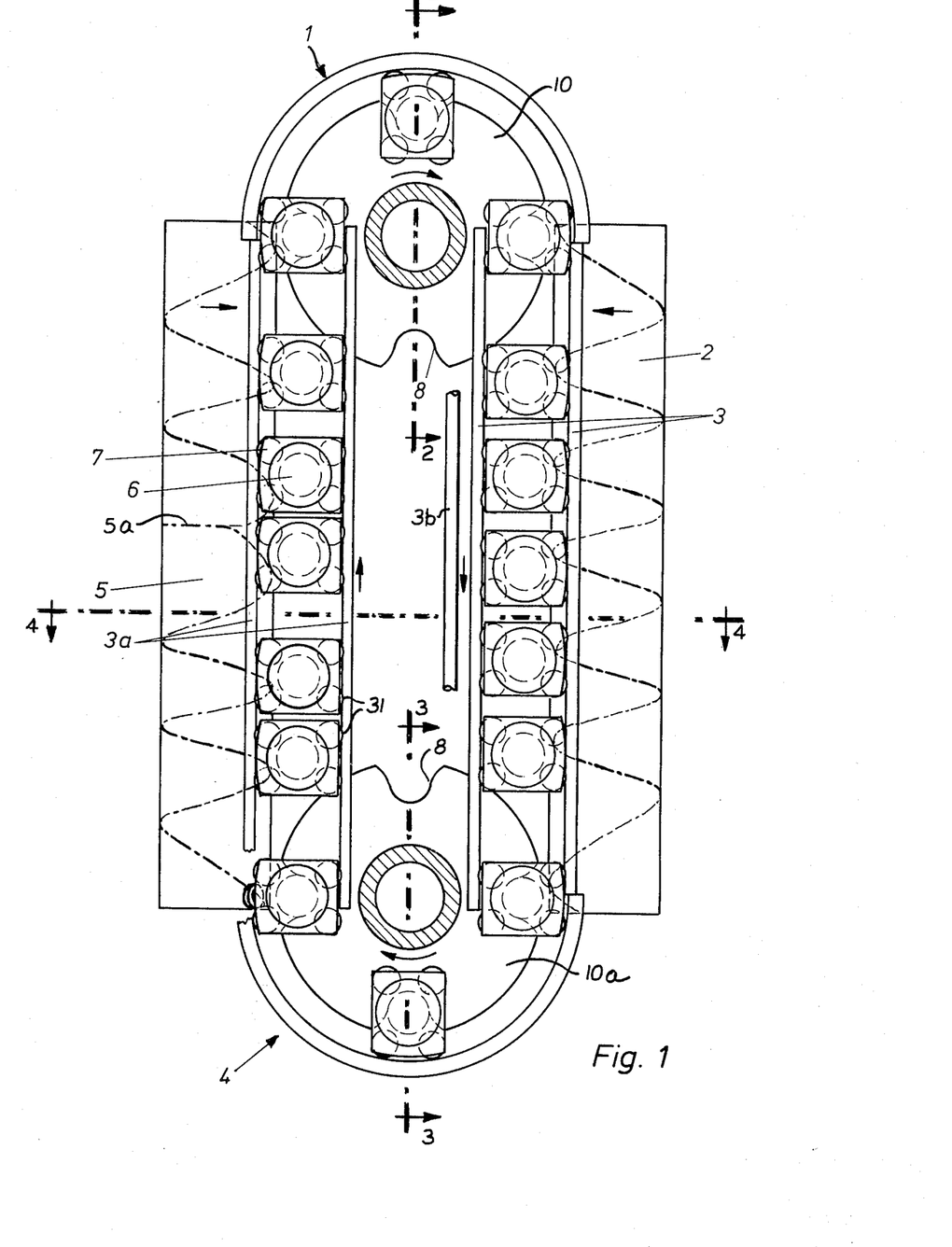
FIG. 1 is a top plan view of the apparatus of the invention taken along lines 1—1 in FIGS. 2, 3 and 4.
Figure 2:
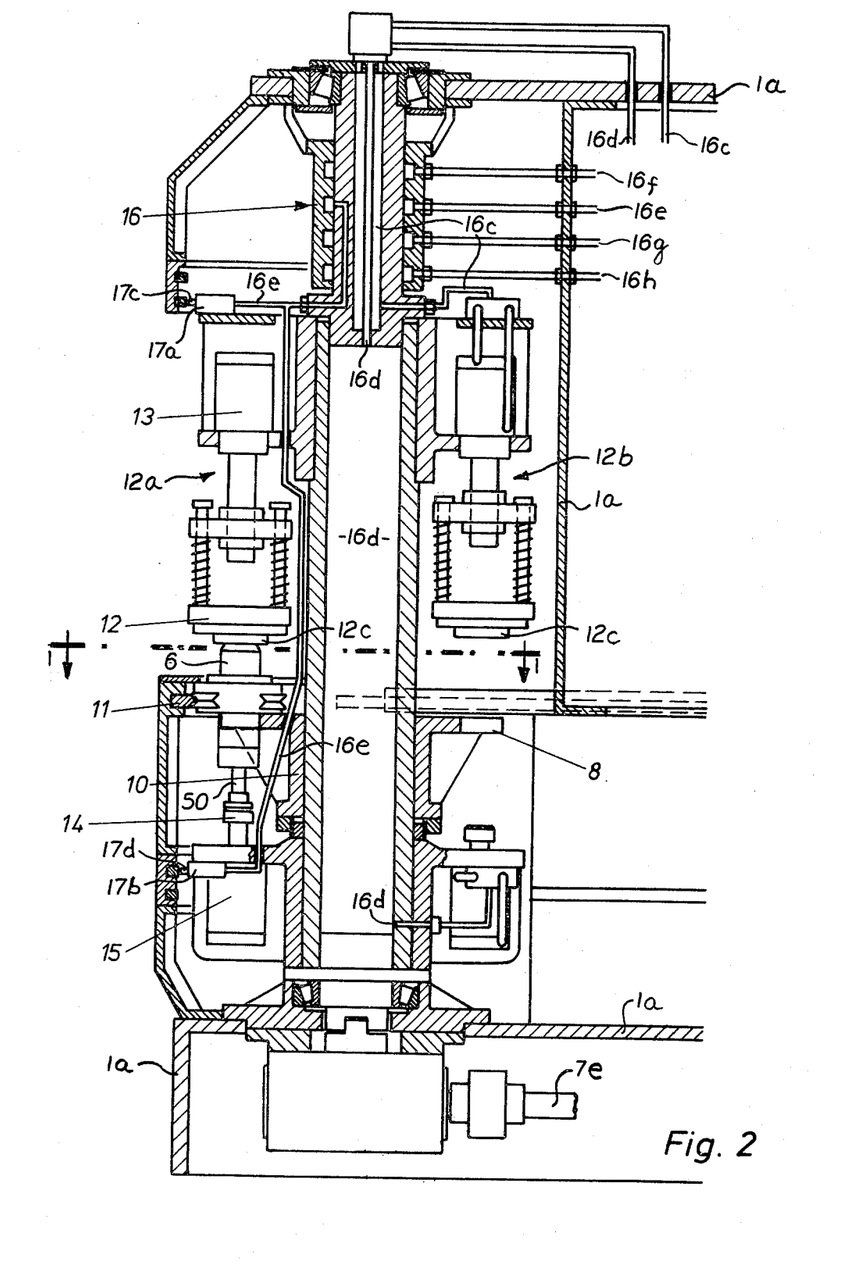
FIG. 2 is a vertical cross section through the press round-table taken along lines 2—2 in FIG. 1.
Figure 3:
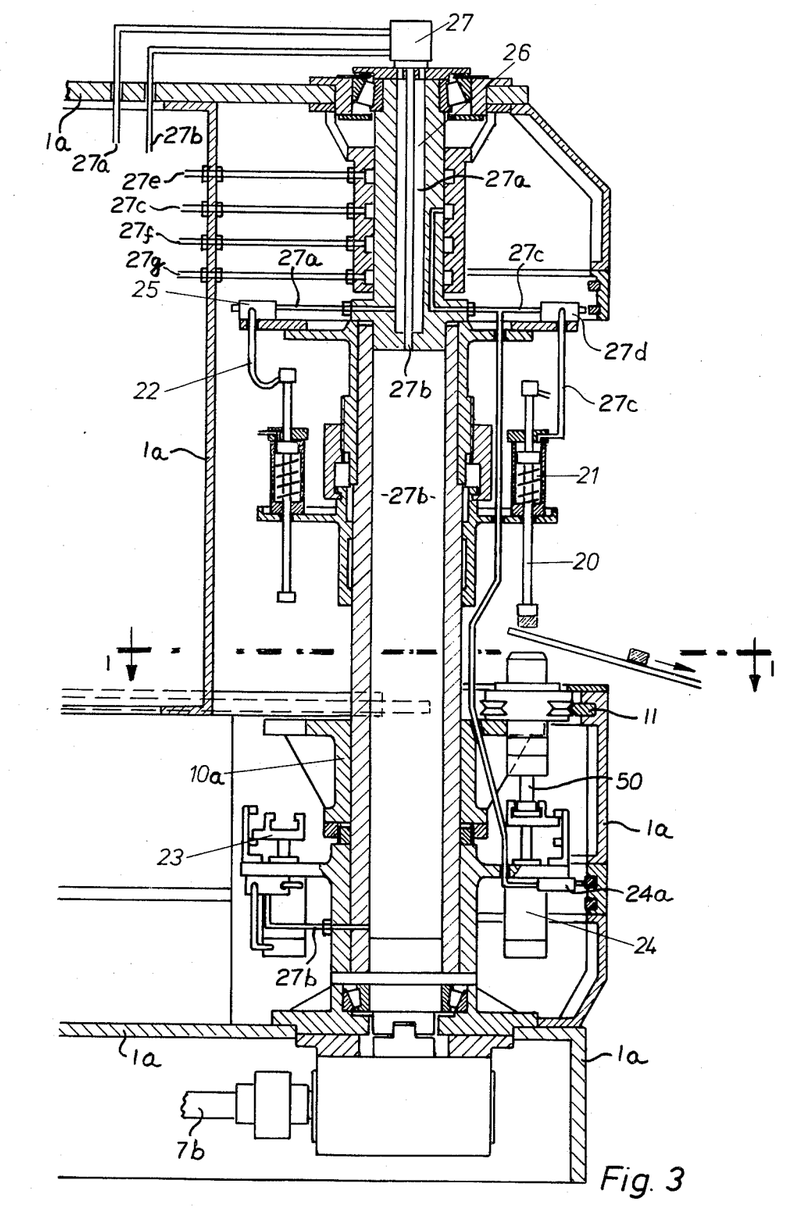
FIG. 3 is a vertical cross section through the mold stripping round-table taken along lines 3—3 in FIG. 1.

FIGS. 16, 17, 18, 19 and 20 show details of the mold with a brake for the bottom plunger; and The round-table assemblies 1 and 4 and the drive cylinders 2 and 5, which are mounted on frame 1a, each revolves at a uniform velocity, in the technical sense, about its main axis. The carriages 7 on which the molds 6 are fastened are guided by the rollers 31 in transport tracks 3–3a and are driven by rollers 30 (FIG. 4) which engage the grooves in the drive cylinders 2 and 5. As they traverse the round-table assemblies 1 and 4, they are carried and driven by the notches 8 in table 10 and 10a and held in place by means of the rail 11. In the tables 10 and 10a the carriages are driven at uniform speed, and in the transport tracks 3–3a, they are driven at partially varying speed. The round-table assembly 1 is equipped with four pressing stations (FIGS. 1 and 2) and the round-table assembly 4 (FIGS. 1 and 3) is provided with four stations for the removal of the articles from the molds and their ejection. For example, the pressing stations can be at 90° intervals. Two such pressing stations are shown in FIG. 2, namely stations 12a, 12b. The discharge devices can similarly be at 90° intervals. Two such discharge stations 21 and 21a are shown in FIG. 3.

The press will be described in greater detail on the basis of an example of a possible procedure which can be performed with the press, namely:

Feeding the glass into the mold from a strand;
Pressing from below;
Cooling of the glass;
Removal from the molds.

Figure 5:
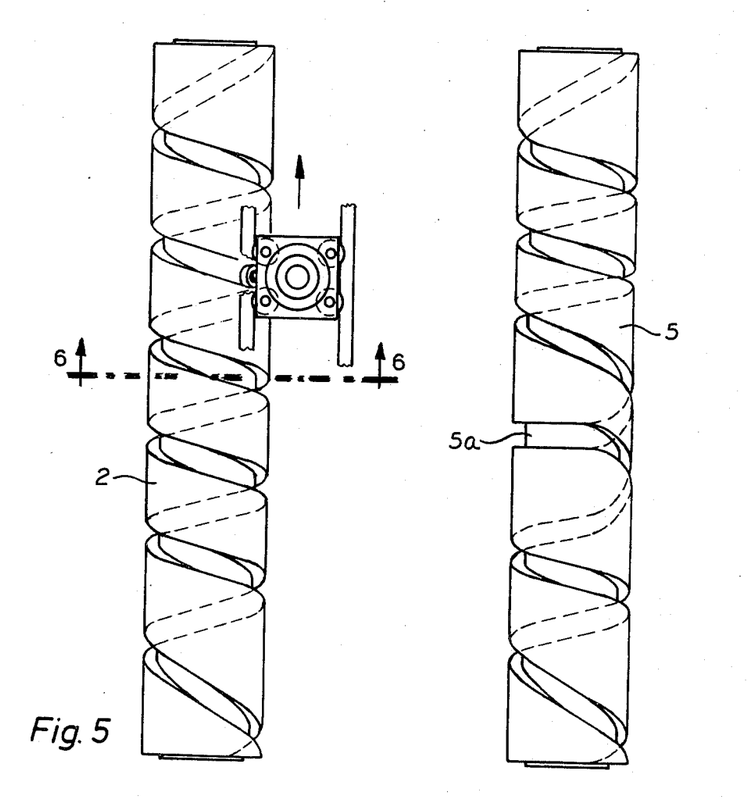
FIG. 5 is a plan view of the transport cylinders.
Figure 6:
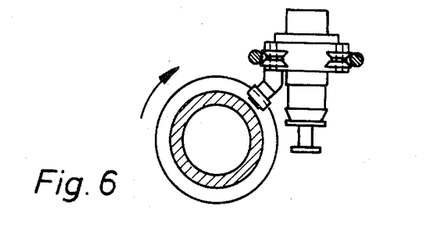
FIG. 6 is a vertical cross section through one transport cylinder taken along lines 6—6 in FIG. 5.
Figures 10, 11, 12:
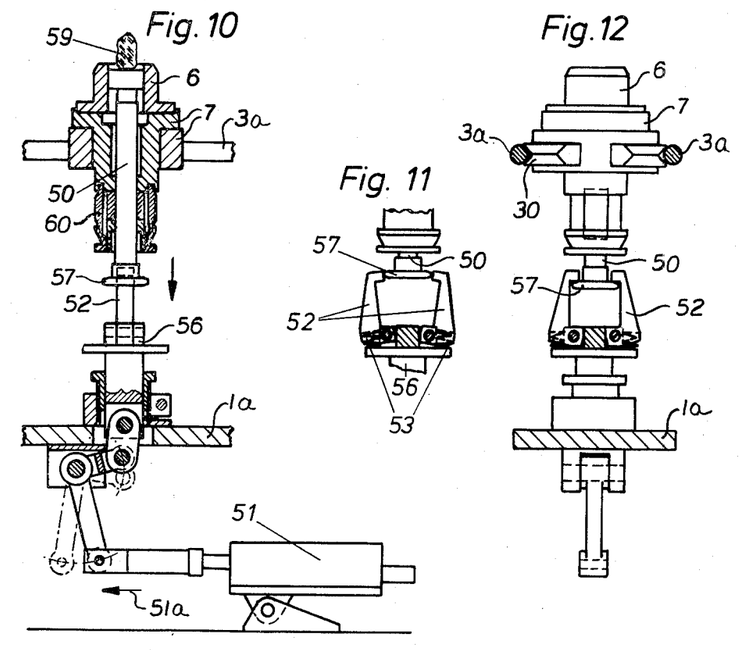
FIG. 10 shows a mold being fed with a strand of glass in the filling position.
FIG. 11 shows the position of the resiliently pivoted claws being pushed underwards when the bottom plunger enters the feeding station in a wrong position.
FIG. 12 shows the pull-down claws in the working position.

At a point 5a of zero pitch in the groove in drive cylinder 5 the mold 6 stands still. See FIG. 1 and FIG. 5 (in FIG. 5, the showing is with round-table 1 at the bottom and round-table 3 at the top, i.e., FIG. 1 is turned 180°). The mold 6 can have a fixed capacity at the feeding station 5a, or can have a variable capacity as is the case when a bottom plunger is varied for initial entry of the glass and lowered as glass flows into the mold. An embodiment wherein such variable capacity is provided is indicated in FIGS. 10–12.

Figure 4:
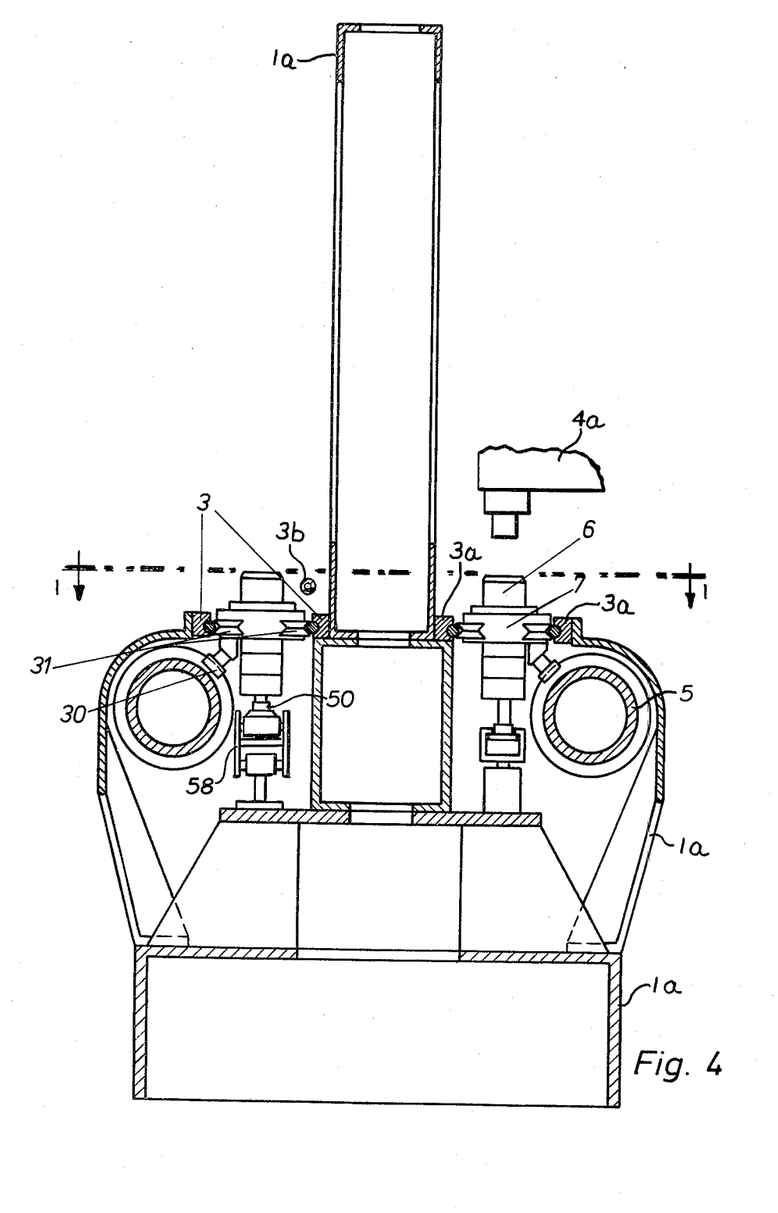
FIG. 4 is a vertical cross section through the transport ways taken along lines 4—4 in FIG. 1.

When the mold 6 enters the feeding station the bottom plunger 50 (FIG. 10) is in its upper position and, supports the glass strand 59 which issued from feeder 4a (FIG. 4). Plunger 50 is lowered when the piston 51 is moved in the direction indicated by arrow 51a as the glass continues to flow in, so slowly that the volume thereby created in the mold corresponds approximately to the volume of the entering glass. The rate of lowering is controlled in a known manner by means of a hydraulic friction device (not shown) which is connected to cylinder 51. To prevent levers 52 from being damaged when the mold enters the feeding station with bottom plunger 50 in a wrong position a safety device is provided. FIG. 11 shows how the levers 52 are joined resiliently to the support 56 and can be pushed back by the flange 57 as the flange moves into the levers 52, to prevent the levers being damaged by running against the flange 57. FIG. 12 shows the flange 57 in the normal position, within the levers or claws 52. The cylinder 51 can then be actuated to lower the bottom plunger 50. The bottom plunger can fit in the carriage 7 so that movement thereof is restrained by friction.

At the end of the feeding process the glass charge is severed from the glass strand by means of a conventional feeder shear, which is not shown, just above the mold 6, and the mold fastened on the carriage 7 is carried out of the feed position and delivered to the round-table assembly 1 (FIGS. 1 and 2) where it is seized and carried by table 10.

As the molds are carried on the turn table assembly 1, the molding is performed and the molds are then transferred to the solidification section defined by track 3. While on turn table assembly 1, molding steps can be performed in any suitable known manner. The upper plunger 12 can first be pressed into the mold, during travel of the mold in the turn table 10, and the lower plunger 50 can thereafter, but still during the travel on the turn table 10, be raised. During travel on the turn table 10, the molding is sufficiently completed so that, during such travel, the upper plunger 12 (which is part of the turn table assembly) can be raised, to permit the transfer of the carriage 7 with the mold 6 to the tracks 3. The lower plunger 50, however, is part of the carriage 7, and can remain in the raised position during the transfer and, indeed, during travel on the tracks 3 where further solidification occurs. A description of one embodiment for the operation of turn-table assembly 1 follows.

Figure 16:
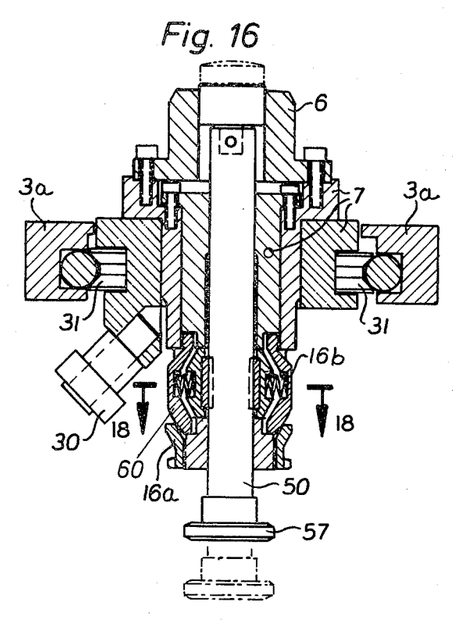
Figure 17:
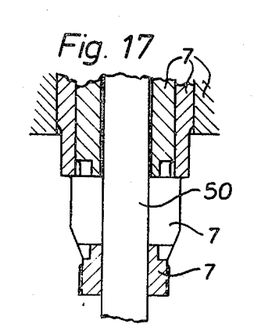
Figure 18:
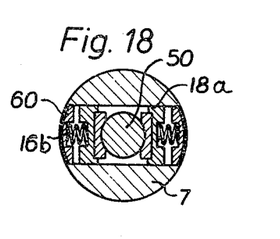
Figure 19:
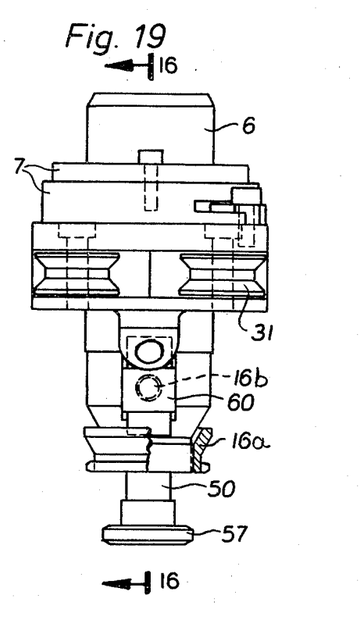
Figure 20:
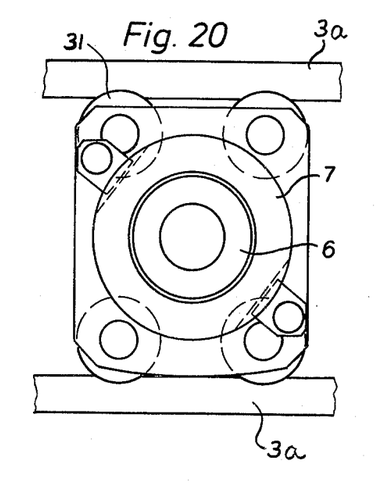

After the mold enters table 10, the upper plunger 12, which carries any suitable dye fixture (not shown) on its endpiece 12c, is first pressed onto the mold by means of cylinder 13 (FIG. 2), and then the bottom plunger 50 is raised upwardly by means of cylinder 15 and ram 14 and the glass is pressed. The return of ram 14 and upper plunger 12 thereafter takes place; the upper plunger 12 is raised while the bottom plunger 50 remains in the pressing position and is held by the adjustable brake 60 (FIGS. 16, 17, 18, 19 and 20). This brake is so constructed that it will hold the lower plunger 50 in any desired position. The adjustable brake 60 is indicated schematically in FIG. 10 and in detail in FIGS. 16–18. FIG. 16 is taken on line 16—16 in FIG. 19; FIG. 18 is taken on line 18—18 in FIG. 16. Referring to FIG. 18, gripping plates 18a grasps lower plunger 50, with a force adjustable by the setting of the nut 16a (FIG. 16) which serves to adjust the working tension of the springs 16b.

The air for control and operation, and the fuel gasses for the occasionally necessary heating of the upper plunger are delivered through the stationary connector 16.

After the mold has been transferred from the round-table assembly 1 to track 3 and drive cylinder 2, the mold transport speed is reduced and the molds are brought closer together, thereby achieving a space-saving construction. On the track 3 there are provided devices for the cooling of the glass and the mold, in known manner. Cooling means are indicated schematically in FIG. 1 by header 3b for supplying cooling air.

Figure 13:
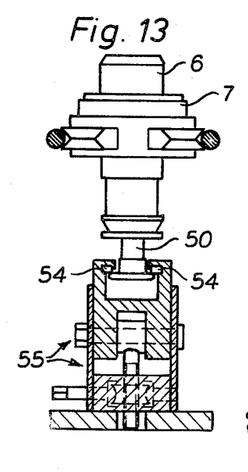
FIGS. 13, 14 and 15 show a devices for pulling down and lifting up the bottom plunger.
Figure 14:
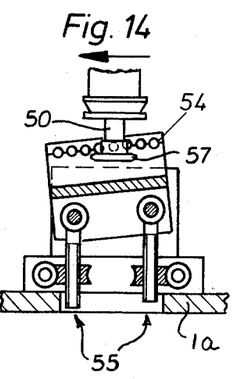
Figure 15:
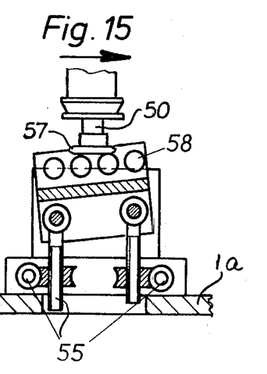

Before mold 6 enters into the round-table assembly 4 (FIGS. 1 and 3) the bottom plunger 50 is raised by the roller train 58 (FIG. 15). As the molds are carried on the turn-table assembly 4, the molded articles are removed in any suitable known manner. A preferred mode for the removal is as follows:

On the round-table assembly 4 in which the mold is received and carried as it is on round-table assembly 1, extractors 20 are provided which are operated by cylinder 21 and extract the glass from the mold by means of a vacuum. The vacuum is brought to extractor 20 through stationary connector 27, vacuum tank 26, valve 25 and tube 22. Cylinder 24 raises claw 23 and bottom plunger 50 to push the glass entirely out of the mold. When the final mold volume is to be set prior to feeding then the bottom plunger may be lowered again by means of roller train 54 (FIG. 14) after the mold has left the round-table assembly 4. In this case the action of cylinder 51 is not required. To enable the heights of roller trains 54 (FIG. 14) and 58 (FIG. 15) to be adapted to the dimensions of the molds in operation, the roller trains are provided with adjusting devices 55 (FIG. 13).

After having left round-table assembly 4 the mold driven by the drive cylinder 5 and guided by transport track 3a is slowed down and continues on its way at lower speed. When it has traveled approximately the first third of the length of transport cylinder 5, it is accelerated again and is brought at high speed right up to the mold that is ahead of it and standing still at the feeder station 5a, and it is brought into the feeding position while simultaneously the preceding mold is accelerated and carried out of the feeding position. Carriage 7 on which mold 6 is fastened runs on rollers 31 in the straight track 3a (FIG. 4). The cycle begins again.

The transport of the carriages 7 is performed here again by means of cylinder 5 (FIG. 4) which has a varying pitch. This pitch may, of course, also be constant. The carriages may also be driven by any other desired means.

The main drive of the machine can be mechanical (FIGS. 7, 8 and 9) and is provided with the crank 40 (FIG. 7) for manual adjustment or to set the machine up for a changeover. The pressing and mold stripping station and the pull-down system for the bottom plunger 50 can be pneumatically operated. Those machine groups may also be driven mechanically or hydraulically.

Figure 7:
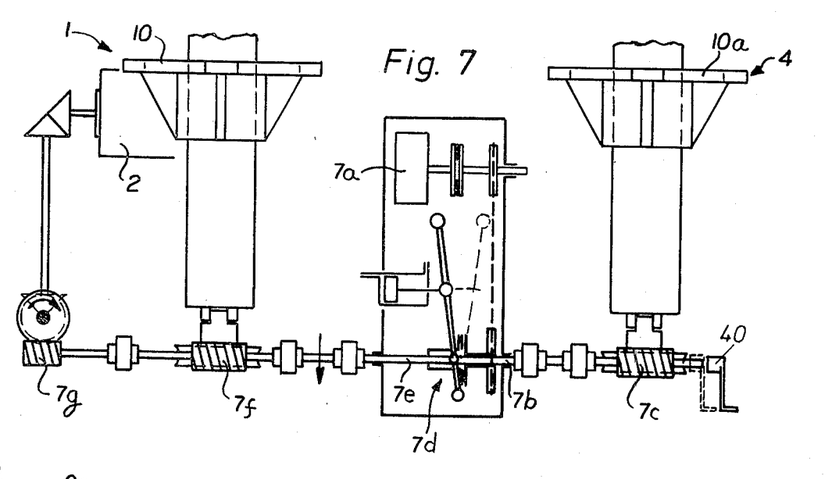
FIGS. 7, 8 and 9 are schematic diagrams of the machine drive.
Figure 8:
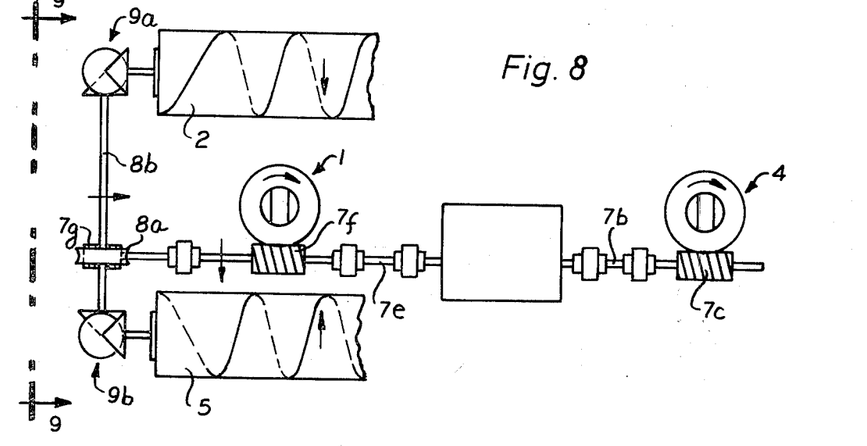

FIG. 7 is a schematic showing in elevation; FIG. 8 is a schematic plan view; and FIG. 9 is a schematic end view taken along line 9—9 in FIG. 8.

Main drive means 7a is linked to shaft 7b, on which is mounted the worm 7c, which is connected to drive for round table 4. Through the hydraulic or manually operated clutch 7d, the shaft 7e can be engaged with the main drive 7a. Worm 7f on shaft 7e drives the round table assembly 10, and worm 7g meshes with pinion 8a, which imparts rotation to shaft 8b. Shaft 8b drives cylinders 2 and 5, respectively, via gear trains 9a and 9b.

Figure 9:
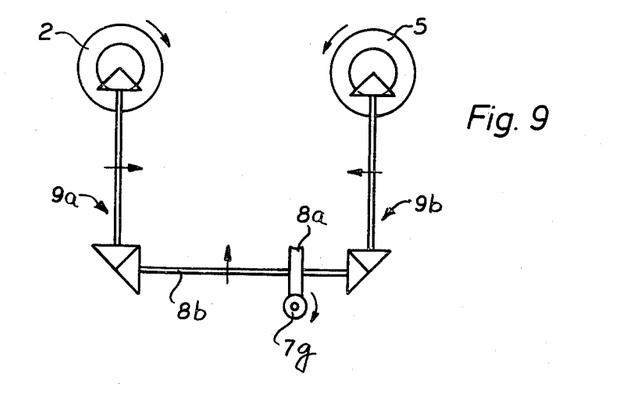

In the embodiment of FIGS. 7–9, a single drive, namely 7a, is used to drive the round-table assemblies 1 and 4 and the cylinders 2 and 5. By reason of the linkages, the round-table assemblies and the cylinders are or can be driven at rpm's as are appropriate to provide the desired individual speeds for the various working elements. The drive can be in accordance with German Gebrauchmuster No. 1,908,972.

According to the invention there can be at least one difference in speed along the work paths of the varying stages such as turn-table assemblies 1 and 4 and the straight courses along the cylinders 2 and 5. Each turn-table can rotate at a constant RPM. The speed of the carriages driven by each turn-table can be constant and the constant speed for the two turn-tables can be the same. The cylinders 2 and 5 can rotate at the same RPM, and where they do, variations in speed can be provided along one or both cylinders by selection of suitable designs for the helical grooves in the cylinders.

In other apparatus other tools and operating elements as well as other individual processes may be necessary, but the principle will remain the same.

Referring to FIG. 2 the folling air and gas passages are distributed by connector 16:

16c is the ducting for the operating air for cylinders 13; 16d is the ducting for the operating air for cylinders 15. Control air for cylinders 13 and 15 is led through ducting 16e. Cooling air for the upper plungers 12 is connected to pipe 16f and fuel gas and oxygen for the eventual heating of upper plungers 12 is connected to pipes 16g and 16h. The passage of the cooling air and fuel gases within the machine is not shown in FIG. 2.

Cylinders 13 and 15 are actuated by valves 17a, 17b and the corresponding cams 17c, 17d respectively.

Similarly air and gas connections are provided at the round-table assembly 4 shown in FIG. 3. Vacuum is connected to extractors 20 by ducting 27a and 22 and is controlled by cam operated valve 25. Operating air for cylinders 24 is transferred through ducting 27b whereas ducting 27c is used for the transfer of control air for cylinders 24 and control and operating air for cylinders 21. The actuation of cylinders 21 is controlled by cam operated valves 27d. Cylinders 24 actuated by cam-operated valves 24a. Connections 27e, 27f and 27h are provided for cooling air or fuel gases for heating is required at any stage of the process.

What is claimed is:

1. Apparatus for production of pressed objects from plastic material by pressing of charges of the material in at least one mold mounted on a carriage which is routed over an endless course comprising a charging section, a pressing section, a solidification section and a discharging section, comprising:
   a. a first straight track for receiving the carriage and mold from the discharging section, conveying the carriage and mold through the charging section for charging of the mold and then conveying the carriage and charged mold to the pressing section, means for delivering a charge of material to the mold during passage thereof through the charging section,
   b. a first round-table assembly providing the pressing section, disposed to receive the carriage and charged mold from the first straight track and comprising pressing means for pressing the charge to form the charge into the shape of the pressed object,
   c. a second straight track for receiving the carriage and charged mold from said first round-table assembly, and conveying the charged mold to the discharging section, for solidification of the pressed charge during passage thereover,
   d. a second round-table assembly providing the discharging section, disposed to receive the carriage and charged mold from the second straight track and comprising discharge means for discharging the pressed, solidified charge from the mold as said pressed object, and for delivering the carriage and empty mold to the first straight track,
   e. a first continuously operating drive means for driving the carriages over said first straight track, a second continuously operating drive means for driving the first round-table assembly, a third continuously operating drive means for driving the second straight track section, and a fourth continuously operating drive means for the second round table assembly, said first, second, third, and fourth drive means being disposed at fixed positions along said endless course.

2. Apparatus according to claim 1, comprising a plurality of said molds and carriages said first, second, third and fourth drive means each driving each of the carriages independently over each of said straight tracks and about said round-table assemblies.

3. Apparatus according to claim 1, the first round-table assembly comprising at least two pressing means.

4. Apparatus according to claim 1, the second round-table assembly comprising at least two discharging means.

5. Apparatus according to claim 1, and means for cooling the mold during passage thereof over the second straight track.

6. Apparatus according to claim 1, said second and fourth drive means being means for driving the carriage through each of the pressing station and the discharge section at a uniform speed.

7. Apparatus according to claim 1, said first and third drive means being means for driving the carriage over each of the charging section and the solidification section at a varying speed.

8. Apparatus according to claim 1, wherein first and third drive means each comprises, for driving the carriage over the straight tracks, a cylinder having a cam track winding over the length thereof, and means for rotating the cylinder, the carriage having a cam in engagement with the cam track for driving of the carriage by the cam track in response to rotation of the cylinder.

9. Apparatus according to claim 1, said first drive means including means for driving the carriage over the charging section at a varying speed with the speed being zero at one point along the charging section.

10. Apparatus according to claim 9, said means for charging the mold being for charging the mold at the point along the charging section at which the speed of the carriage is zero.

11. Apparatus according to claim 1, said first drive means including means for driving the carriage at a varying speed over the charging section for conveying the carriage at a reduced speed over a portion of the charging section, said means for charging the mold being disposed for charging the mold at said portion.

12. Apparatus according to claim 1, wherein said first drive means comprises a cylinder having a cam track winding over the length thereof, the carriage having a cam in engagement with the cam track for driving of the carriage in response to rotation of the cylinder, the pitch of the cam track varying along the length of the cylinder for travel of the carriage at a reduced speed over a part of the travel thereof along the first straight track, said means for charging the mold being disposed along the first straight track for charging the mold while the carriage is at said reduced speed.

13. An apparatus for production of pressed objects from plastic material by pressing of charges of the material in at least one mold routed on a carriage over an endless course comprising a charging section, a pressing section, a solidification section and a discharging section, the improvement which comprises:

a. a straight track for receiving empty mold from the discharging section, conveying the empty mold through the charging section for charging of the mold and then conveying the charged mold to the pressing section, means for delivering a charge of material to the mold during passage thereof through the charging section, b. said carriage being mounted on the apparatus for travel over said track and said molds being mounted on the carriage, c. continuously operating drive means for driving the carriage and mold over said endless course, said drive means comprising, for driving and carriage over the straight track, a cylinder having a cam track winding over the length thereof, and means for continuously rotating the cylinder, the carriage having a cam in engagement with the cam track for driving of the carriage in response to rotation of the cylinder, the pitch of the cam track varying along the length of the cylinder for travel of the carriage at a reduced speed over a part of the travel thereof along the straight track, said means for charging the mold being disposed along the first straight track for charging the mold while the carriage is at said reduced speed.

14. Apparatus according to claim 13, said variation of the pitch of the cam tract being such that said reduced speed is zero.

* * * * *

UNITED STATES PATENT AND TRADEMARK OFFICE
CERTIFICATE OF CORRECTION

PATENT NO. : 3,951,636
DATED : April 20, 1976
INVENTOR(S) : Franz Günther

It is certified that error appears in the above-identified patent and that said Letters Patent are hereby corrected as shown below:

Column 4, line 31, change "are" to --not--.

Column 10, line 37, (claim 1, sub-paragraph c, line 3) after "conveying the" insert --carriage and--.

Column 10, line 50, (claim 1, sub-paragraph e, line 5), after "for driving" insert --the carriage over--.

Signed and Sealed this

Fifteenth Day of March 1977

[SEAL]

Attest:

RUTH C. MASON
Attesting Officer

C. MARSHALL DANN
Commissioner of Patents and Trademarks